UNITED STATES PATENT OFFICE.

WILLIAM W. SIMONSON AND LEWIS V. D. BLAIR, OF CINCINNATI, OHIO, ASSIGNORS TO THE MANTLE LAMP COMPANY OF AMERICA, OF CHICAGO, ILLINOIS, A CORPORATION OF ILLINOIS.

INDURATED ORGANIC SUBSTANCE AND PROCESS FOR PREPARING THE SAME.

1,309,967.     Specification of Letters Patent.     Patented July 15, 1919.

No Drawing.     Application filed June 1, 1918. Serial No. 237,830.

*To all whom it may concern:*

Be it known that we, WILLIAM W. SIMONSON and LEWIS V. D. BLAIR, citizens of the United States, residing at Cincinnati, in the county of Hamilton and State of Ohio, have invented certain new and useful Improvements in Indurated Organic Substances and Processes for Preparing the Same, of which the following is a specification.

Our invention relates to the induration and toughening of organic substances which are usually obtainable in the form of gummous exudates, lac being an exudate of the kind to which the invention is applicable.

The invention consists in a chemical process whereby such induration is initiated, and also in a slightly indurated product; and it further consists in a related thermal process by means of which the slightly indurated product is further indurated and given the great tenacity and adherence which certain uses require.

In carrying the process into effect, the natural organic exudate is first relieved of its impurities, and, if it contains wax, may then be rendered wax-free in a usual manner by treatment in a hot solution of alkali, as for instance caustic soda, finely divided kaolin being used as a clarifying agent. If the exudate be a lac (lac contains free acids, resenes and esters of aleuritic acid), the proportions of the ingredients of the solution may be 100 parts by weight of shellac, 4.5 parts by weight of caustic soda and 1000 parts by weight of water, the shellac being slightly in excess of the quantity which is dissolved, in order that all of the caustic soda will be utilized in neutralizing the free acids of the shellac and no free caustic soda, which may produce undesirable reactions, will remain. The resulting product is a clarified solution of shellac constituents in water, the wax and other foreign substances having been removed.

Induration is effected by mixing a clarified solution of the shellac sodium compound, above described, with lead acetate and a sufficient quantity of water to cause precipitation of the resulting chemical product, (which is a shellac lead compound, the formula being approximately $Pb(C_{46}H_{71}O_{12})_2$), to appear as small flakes which may be easily washed and freed from excess lead acetate and the sodium acetate produced by the reaction. The proportions of the substances in this solution are 100 parts by weight of the shellac sodium compound, 22.5 to 25 parts by weight of lead acetate, and water in the stated quantity. The flakes of the shellac lead compound are strained off and then dried in any convenient manner. These flakes are an indurated gummous product.

This product, if subjected to heat and fused, will become tough and further indurated, and if applied while fused to a solid material and heat treated while in contact with said material will solidify and adhere strongly thereto. Prolonged heating preceding fusion should be avoided. Heating after fusion, either at a constant temperature or at variable temperatures, effectuates elimination of constitutional water, produces polymerization and increases the viscosity of the fused and adherence of the solidified compound. The period of treatment should vary according to the mass treated. If the mass under treatment is of considerable magnitude, heat should be gradually applied so that incrustation of the surface of the mass will be avoided and free escape of the volatilized constituents permitted. The temperature during the maturing period may be controlled to avoid rapid vaporization, so that if desired, a substantially non-porous product may be produced. The elimination of the constitutional water is accompanied by polymerization, condensation, and hardening, but is not attended by substantial volatilization of the organic constituents of the compound. This is true not only as regards the initial fusion temperature, but successively higher fusion temperatures. If the the gummous substance under treatment is shellac, the product will be a shellac lead compound which fuses at about 240° F. While certain results may be attained by employing shellac containing the natural wax, it is preferable to use wax-free commercial shellac in order that the indurated product may not contain a substance which will affect its toughness, elasticity or adherence.

When a dry mass of the compound is fused, it will adhere to a contacting surface. Prolongation of the heat treatment increases the tenacity of the mass even if the temperature be not raised, but greater tenacity and adhesion are secured and the maturing period shortened, by maintaining the temperature above the point of initial fusion. These conditions apply to the maturing of substances fusing at different temperatures.

A superior compound may be produced by mixing the shellac lead compound with wax-free shellac. The wax-free shellac is obtained by taking a portion of the above described clear solution of shellac sodium compound and adding thereto a small excess of acid such as hydrochloric acid, in order to eliminate the sodium in the form of a soluble salt, and precipitate the shellac. The shellac lead compound and the wax-free shellac are preferably mixed in the proportion of one part by weight of the shellac lead compound, and two parts by weight of the wax-free shellac. Further induration and toughening of this compound may be thermally produced in the manner above described.

The temperature of fusion of the compound may be varied by changing the proportions of its components, the fusion point being raised by increasing the relative quantity of the metallic derivative and also being widely varied by the substitution of different methods in the metallic derivative. For instance, a calcium compound has an appreciably higher initial melting point than a similar compound made with lead, the difference between the initial fusion points of these two compounds being approximately 100° F. When a product having a low initial fusion temperature is desired, a lac without a metallic substitution may be subjected to the thermal process as described.

The temperature of fusion of the compound may be varied by the introduction of kindred gummous substances, or wholly or partially polymerized materials. The fluency of the mass may also be varied by the introduction of substances which are comparatively inert in the composition, such as talc and calcium sulfate. Charcoal may be added either as a substitute for or in addition to these substances. The use of charcoal possesses the additional advantage of qualifying the elimination of the volatilized substances, and shortening the period of time necessary to satisfactorily complete the process of polymerization and maturing. This feature of influencing the ebullition of the compound during fusing facilitates the solidification of the compound and permits the production of a substantially non-porous product in a shorter period of time than is required if the vaporization of the volatile constituents are controlled by temperature alone.

Barium, calcium, magnesium, aluminum, zinc and other metals may be substituted for lead, such metals being obtained from their salts as previously described and the products treated by the thermal process. The approximate initial fusing temperature of the lead compound is 240° F., of the barium compound 285° F.; of the calcium compound 340° F., and of the magnesium compound 260° F.

An alkali-shellac compound is obtained by evaporating to dryness the clarified solution above described, and the dessicated product may be indurated by the heat treatment herein described.

An alternative method of preparing the metallic derivative of shellac (or gummous exudate), consists in dissolving the exudate in a solvent, such as alcohol or acetone, adding a sufficient quantity of the desired metal hydrate, mixing or agitating to effect a chemical combination and evaporating the solvent.

In the case of all of the above described compounds, polymerization ceases and decomposition begins at substantially 525° F., the organic constituents being unstable at this temperature.

The indurated product either before or after having been fused may be associated with a vehicle such as a solvent and applied as a varnish.

The thermally threaded, elastic, indurated and toughened product is insoluble in water, soluble in alcohol and alkaline solutions, is not appreciably softened at 212° F., is impervious to air and possesses substantially the tenacity of glass.

When, in the claims, we use the expression "organic exudate" we refer not only to an organic exudate, as such, which may have become altered by external influences, but to the unchanged sap or secretion from which the exudate is derived, or to a substance artificially produced from said sap or secretion.

By "derivative" we mean the original exudate freed from impurities, or the original exudate associated or combined with other or kindred substances or metals.

In the case of shellac, the empirical formula is $C_{46}H_{72}O_{12}$. Loss of hydrogen and oxygen atoms leaves the empirical formula as $C_{46}H_{64}O_8$.

Having thus described our invention, what we claim and desire to secure by Letters Patent is:

1. The process of producing a desired indurated organic metal compound, which consists in subjecting a lac to the action of a chemical agent to produce a metal lac compound, and subjecting said metal shellac compound to the action of the salt of another metal to effect substitution of the metal of said salt for the metal of the shellac compound.

2. The process of producing a desired indurated shellac metal compound, which consists in subjecting shellac to the action of caustic soda in solution, to produce a sodium shellac compound, and subjecting said sodium shellac compound to the action of the salt of another metal in solution to effect substitution of the metal of said salt for the sodium.

3. The process of producing a desired indurated organic metal compound, which consists in subjecting a lac exudate to the action of a chemical agent to produce a metal lac compound, subjecting said metal lac compound to the action of the salt of another metal to effect substitution of the metal of said salt for the metal of the shellac compound, and treating the precipitate by heat to complete its induration.

4. The process of producing a desired indurated shellac metal compound, which consists in subjecting shellac to the action of caustic soda in solution, to produce a sodium shellac compound, subjecting said sodium shellac compound to the action of a metal salt in solution to effect substitution of the metal of said salt for the sodium, and treating the precipitate by heat to complete its induration.

5. The process of producing a desired indurated metal compound from a gummous substance, which consists in combining a gummous exudate with a selected metal to form a metallic derivative of the gummous exudate, and subjecting the resulting product to heat treatment to complete the induration.

6. A process which consists in heating an undissolved non-volatile natural gummous material to the melting point and continuing the heating of the material until alteration of the constituents sufficient to raise the melting point of the material, is effected.

7. A process, which consists in heating an undissolved material, including a gummous substance, and a metallic derivative of a gummous substance to the melting point, and continuing the heating of the material until alteration of the constituents sufficient to raise the melting point of the material, is effected.

8. A process of raising the melting point of a material including a gummous substance and a metallic derivative of a gummous substance, consisting of fusing the material and continuing heating until polymerization is effected.

9. The process of induration, which consists in subjecting an organic exudate to the heat of fusion, and to subsequent heat treatment sufficiently prolonged to effectuate alteration of the chemical constituents and produce the desired induration.

10. The process of indurating an undissolved organic substance containing a chemically combined metal, which consists in subjecting said substance to heat treatment, thereby altering the relations of its constituents and effecting polymerization.

11. The process of induration, which consists in subjecting an organic substance containing an ester and resene to heat treatment to alter the constituents thereof.

12. The process of producing a substantially non-porous polymerized product, which consists in fusing a gummous substance, and so controlling the temperature during the period of polymerization as to avoid rapid vaporization of volatile constituents.

13. The process of producing a substantially non-porous polymerized product, which consists of fusing a gummous substance containing charcoal.

14. The process of producing a substantially non-porous polymerized product, which consists in fusing and thereby polymerizing a gummous substance and controlling ebullition during the period of polymerization.

15. The process of producing an indurated fusible material consisting in polymerizing a metallic derivative of an organic exudate.

16. The process of producing a desired indurated lac compound, which consists in subjecting lac to the action of an alkali to eliminate the wax constituent, and in polymerizing constituents of the resulting compound.

17. The process of producing an indurated product, which consists in subjecting a mixture of dissimilar polymerizable substances to heat treatment continued until said substances are converted into one homogeneous polymerized mass.

18. An indurated, substantially non-porous, polymerized, gummous exudate.

19. A polymerized product of an unpolymerized exudate, having a higher melting point than the unpolymerized organic exudate.

20. A polymerized product of an organic exudate, having a higher melting point than the unpolymerized exudate.

21. An indurated polymerized product, including an organic exudate, the polymerized product having a higher melting temperature than the unpolymerized exudate.

22. A gummous organic exudate, polymerized by heat treatment to form a material having a melting temperature higher than that of the untreated organic exudate.

23. A material, including a heat polymerized gummous exudate capable of solution in alcohol and other well-known solvents of resins, which polymerized exudate on evaporation of such solvents may be further polymerized.

24. A material composed of gummous exudates, one of which has been partially polymerized, said material being capable of solution in alcohol and other well-known solvents of resins, and, on evaporation of such solvents, of being further polymerized.

25. A heat polymerized material, including a gummous organic exudate, and a derivative of a gummous material, the melting point of which may be gradually raised by heat treatment.

26. A heat polymerized material, including a gummous organic exudate, and a derivative of said substance, the fusing point of which material may be raised by heat treatment.

27. A polymerized material including a gummous organic exudate and a derivative of a gummous substance, the adherent property of which material may be gradually increased by heat treatment.

28. A heat polymerized material, including a gummous exudate and a metallic derivative of a gummous material, capable of solution in alcohol and other well-known solvents of resins.

29. A heat polymerized material, including a gummous exudate and a metallic derivative of a gummous material, capable of solution in alcohol and other well-known solvents of resins, and which on evaporation of such solvents may be further polymerized.

30. A substantially non-volatile fusible material, including a metallic derivative of an organic exudate and capable of polymerization by heat treatment.

31. A substantially non-volatile fusible material, including a lead derivative of an organic exudate and capable of polymerization by heat treatment.

32. An undissolved substance, including a metal derivative of an organic exudate, which substance upon fusion is capable of adherence to solids and, once having been fused, is capable, by heat treatment, of being rendered abnormally adherent to solids.

33. A compound, composed of an organic exudate and a metallic element chemically combined therewith, and capable of attaining its highest fusion point and of eliminating its constitutional water, without substantial volatilization of its organic constituents.

34. A heat polymerized product of wax-free lac, the melting point of which may be raised by heat treatment at a constant temperature.

35. A heat polymerized product of lac, the melting point of which may be raised by heat treatment at a constant temperature.

36. A heat polymerized product of lac, the melting point of which may be progressively raised by heat applied at successively higher temperatures.

37. A heat polymerized product of wax-free shellac, the melting point of which may be progressively raised by heat applied at successively higher temperatures.

38. A heat polymerized material, including lac and a derivative of a gummous material the melting point of which material may be raised by heat treatment.

39. A polymerized shellac product, including a derivative from an organic exudate and having a higher melting point than shellac.

40. A condensed indurated derivative of an organic exudate, infusible at the temperature of boiling water and capable of being fused after fusion and solidification.

41. A polymerized metal lac compound.

42. A mixture, consisting of shellac and a metallic derivative of an organic exudate, which derivative has been subjected to heat treatment, to increase the melting temperature of the mixture.

43. A compound consisting of shellac and a metallic derivative of a gummous organic exudate, the melting temperature of which mixture has been raised by heat treatment.

44. A polymerizable organic compound, containing esters of aleuritic acid, ether-soluble substances designated as resenes, and a metallic element combined with the radical of an organic acid to produce a salt.

45. A polymerizable organic compound, containing esters of aleuritic acid, ether-soluble substances designated as resenes, and a metallic element combined with the radical of an organic acid to produce a salt, said salt having the mutual affinities of its constituents completely satisfied.

46. A fusible mixture, consisting of an organic exudate, and a gas occluding substance which facilitates the solidification of the fused mixture.

47. An undissolved organic exudate, including a material which influences ebullition and facilitates solidification of the fused exudate during polymerization.

48. A polymerized solid, containing carbon, hydrogen, oxygen and a metal, soluble in alcohol and alkaline solutions, having a high temperature of dissociation, infusible at 212° F., and initially fusible at temperatures ranging from approximately 240° F., upward, according to the contained metal, resilient, impervious to air, capable of adhering to solids under pressure or heat.

49. The process of indurating a gummous exudate, which consists in subjecting a derivative thereof to heat treatment, at a fusion temperature for such length of time, as to alter the relations of its constituents to effect polymerization, and thereby increase its tenacity and adhesion.

50. An indurated non-volatile converted gummous exudate, characterized by containing a different number of hydrogen and oxygen atoms than the original exudate.

51. An indurated non-volatile converted gummous exudate, characterized by containing a lesser number of hydrogen and oxygen atoms than the original exudate.

In testimony whereof we affix our signatures.

WILLIAM W. SIMONSON.
LEWIS V. D. BLAIR.

Witnesses:
CHARLES E. BULTEN,
HARRY E. MALI.

It is hereby certified that in Letters Patent No. 1,309,967, granted July 15, 1919, upon the application of William W. Simonson and Lewis V. D. Blair, of Cincinnati, Ohio, for an improvement in "Indurated Organic Substances and Processes for Preparing the Same," errors appear in the printed specification requiring correction as follows: Page 2, line 36, for the word "method" read *metals;* same page, line 100, for the word "threaded" read *treated;* page 3, line 1, claim 1, for the word "shellac" read *lac;* same page, line 115, claim 19, before the word "exudate" insert the word *organic;* same page and claim, line 116, strike out the word "organic"; and that the said Letters Patent should be read with these corrections therein. that the same may conform to the record of the case in the Patent Office.

Signed and sealed this 20th day of January, A. D., 1920.

[SEAL.]
M. H. COULSTON,
*Acting Commissioner of Patents.*

Cl. 134—26.